Patented Mar. 14, 1950

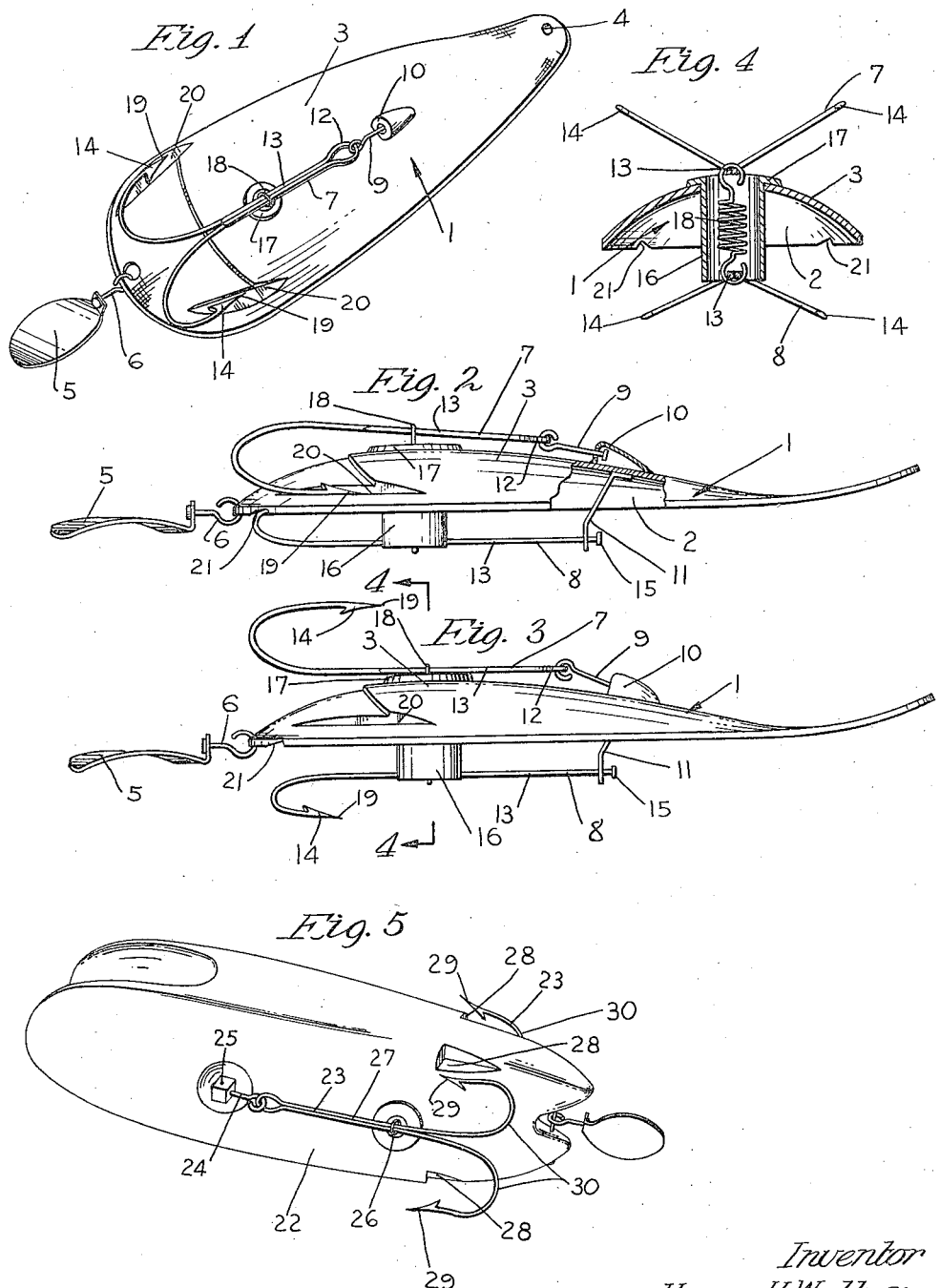

2,500,477

UNITED STATES PATENT OFFICE 2,500,477

ARTIFICIAL BAIT

Harry H. Walker, St. Cloud, Minn.

Application December 8, 1948, Serial No. 64,200

3 Claims. (Cl. 43—42.41)

My invention relates generally to fishing lures and, more particularly, to improvements therein designed to facilitate carrying and transportation of the same and to prevent the hooks thereof from becoming entangled in clothing or the like during such movement.

More specifically, it is the object of my invention to provide a fishing lure in which the barbed ends of the hooks may be safely secured within recesses within the body of the bait so as to allow the bait to be carried even in the pocket of the fisherman without fear of the same becoming entangled in the fabric of the pocket.

A still further object of my invention is the provision of a fishing lure having the above-described safety features without detracting from the efficiency or fish-catching potentialities thereof.

The above and still further objects of my invention will become apparent from the following detailed specification, appended claims, and attached drawing.

Referring to the drawings, wherein like characters indicate like parts throughout the several views:

Fig. 1 is a perspective view of the conventional spoon-type fishing lure constructed according to my invention;

Fig. 2 is a side elevation of the structure of Fig. 1;

Fig. 3 is a view corresponding to Fig. 2 but showing a different position of some of the parts;

Fig. 4 is a view in section, taken on the line 4—4 of Fig. 3; and

Fig. 5 is a perspective view of a plug-type lure constructed in accordance with my invention.

Referring with greater particularity to the structure of Figs. 1 to 4 inclusive of the drawings, the numeral 1 indicates, in its entirety, a conventional elongated spoon-type lure, the concave face of which is indicated by the numeral 2, and the convex face by the numeral 3, and which is provided at its front end with an aperture 4 designed to receive the fish line. As shown, a spinner element 5 is secured to the rear end of the spoon-type lure 1 by means of a swivel connection 6.

Hook elements 7 and 8 are rotatably secured to opposite faces 3 and 2 respectively on axes substantially parallel to the general axis of the spoon-like body 1, the former by means of a swivel element 9 journalled in an ear 10 projecting laterally outwardly from convex face 3, whereas the latter is journalled directly in an ear 11 projecting laterally outwardly from the concave face 2. Hook element 7 is of the conventional type having a loop 12 on the inner end of the shank 13 and a pair of diverging hooks 14 on its outer end. The hook element 8 is of the same general type as hook element 7 including the shank 13 and diverging hooks 14 but, preferably and as shown, is provided at its inner end with a small head 15 which does not interfere with rotation of the shank 13 thereof in the ear 11.

Projecting laterally through the body 1 is a tubular member 16 which is provided at one end with an annular flange 17 which is secured to the convex face 3 of the body 1. As shown, particularly in Figs. 2 to 4 inclusive, the tubular member 16 has an overall length greater than the depth of the concavity formed in the body 1. A short coil tension spring 18 is loosely contained within the tubular member 16 and has one each of its hook-shaped opposite ends engaging the intermediate portion of the shank 13 of the hook elements 7 and 8. Tension spring 18 thus places the hook elements 7 and 8 under bias toward engagement with the opposite ends of the tubular member 16 or operatively toward engagement with opposite faces 3 and 2 respectively of the spoon-like body 1.

When the hook elements 7 and 8 are rotated to the operative fish-catching position of Fig. 3, the intermediate portion of the shanks 13 thereof will be forced into frictional engagement with the opposite ends of the tubular member 16 by spring 18. However, when it is desired to store or ship my novel lure, it is but necessary to rotate the hook elements 7 and 8 to 180° or to a position wherein the hooks 14 thereof diverge in a direction of the body 1. In this position, the spring 18 maintains the barbed ends 19 in engagement with the faces 2 and 3. Preferably and as shown, the convex face 3 is provided with elongated recesses 20 for the reception of the barbed ends 19, whereas the concave face 2 is provided with notches 21 at its peripheral edge for the reception of the angular portion of the hooks 14 as shown in Figs. 2 and 4.

It should be obvious that, when the hook elements 7 and 8 have been positioned as indicated in Figs. 1 and 2, this novel lure may be carried in the fisherman's pocket or in a fish box, together with a large number of other baits and lines, without fear of entanglement. It is also clear that, when the bait is in this position, it requires less room for shipment and storage.

In the modified form of the invention, I have shown a conventional plug 22 formed from wood or the like and having hook elements 23 secured to opposite sides thereof by means of swivel elements 24 secured to ears 25 projecting laterally therefrom. A spring element, similar in all respects to spring 18, is concealed within a transverse bore not shown. Said spring element has its opposite looped ends 26 embracing the intermediate portion of the shanks 27 of the hook elements 23. Said spring element obviously biases the hook elements toward engagement with the opposite sides of the body 22. Recesses 28 on opposite sides of the body 22 are positioned to receive the barbed ends 29 of the hook elements 23 and render the same inoperative when the diverging hooks 30 thereof are positioned as indicated in Figs. 1 and 2.

My invention has been completely tested and found to be satisfactory for the accomplishment of the above objects; and, while I have shown a preferred and modified form of the invention, it should be clear that my invention may be capable of still further modification without departure from the scope and spirit of the invention as defined by the appended claims.

What I claim is:

1. A fish lure including a body, hook elements on opposite sides of said body mounted for rotary movements about the axes of the shanks thereof, and a tension spring extending through said body and having its opposite ends secured one each to the intermediate portion of the shank of one of said hook elements, said tension spring maintaining a portion of the shank of each hook element in frictional contact with said body when the barbed ends thereof are turned outwardly and maintaining said barbed ends in engagement with said body when said barbed ends are turned inwardly.

2. A fish lure including an elongated body, hook elements on opposite sides of said body, said hook elements being rotatably secured to said body on axes substantially parallel to the longitudinal axis of said body and projecting rearwardly less than the length of said body, and a tension spring projecting through said body and having one each of its ends secured to the intermediate portion of the shank of one of said hook elements, said tension spring maintaining a portion of the shank of each hook element in frictional contact with said body when the barbed ends thereof are turned outwardly and maintaining said barbed ends in engagement with said body when said barbed ends are turned inwardly.

3. A fish lure including an elongated body, hook elements swivelled to opposite sides of said body on axes substantially parallel to the longitudinal axis of the body, said hook elements projecting rearwardly a distance less than the length of said body and including a pair of diverging hooks, and a tension spring projecting through said body and having one each of its ends secured to the intermediate portion of the shank of one of said hook elements, said tension spring maintaining a portion of the shank of each hook element in frictional contact with said body when said hooks are moved to a point where they diverge outwardly with respect to the body and maintaining the barbed ends of said hooks in frictional engagement with said body when said hook elements are rotated to a position wherein the hooks diverge in the direction of said body.

HARRY H. WALKER.

REFERENCES CITED

The following references are of record in the file of this patent:

UNITED STATES PATENTS

| Number | Name | Date |
|---|---|---|
| 1,144,756 | Damsma | June 29, 1915 |
| 1,869,111 | McLaughlin | July 26, 1932 |
| 2,036,075 | Peterson | Mar. 31, 1936 |
| 2,230,904 | Parkins | Feb. 4, 1941 |